Patented Feb. 10, 1948

2,435,778

UNITED STATES PATENT OFFICE 2,435,778

RECOVERY OF FINELY DIVIDED POLYMER FROM AQUEOUS EMULSION

Albert J. Gracia, Cuyahoga Falls, Ohio, assignor to Wingfoot Corporation, Akron, Ohio, a corporation of Delaware No Drawing. Application April 11, 1941, Serial No. 388,097

11 Claims. (Cl. 260—84.5)

This invention relates to an improved method of recovering polymerized material from an emulsion and, more particularly, to a method of producing vinyl-vinylidene halide interpolymers and other interpolymers in substantially pure and finely divided condition.

In the manufacture of interpolymers or copolymers from vinyl chloride and vinylidene chloride, the monomeric substances are polymerized in an aqueous emulsion which contains, among other things, an emulsifier which has the effect of maintaining the reactants in finely divided colloidal form during the polymerization, which is conducted with agitation. Heretofore, when the polymerization is complete, or has reached the desired stage of completion, the batch has been allowed to set up in the reactor. The mass thus produced is tough and horny and must be dug out, washed, dried and pulverized. The operation is slow, washing incomplete, pulverizing difficult and much power is necessary to manipulate the mass, which is non-crystalline but porous. Attempts to subdivide this product into particles of small size have not been very successful. In fact, the product is coarse, sandy, hornlike and, while it can be dissolved in a suitable solvent to form coating cements, is altogether undesirable for compounding. Similar difficulties are encountered with other polymerized materials.

Polymers could be handled with much greater facility, both during washing to remove impurities derived from the emulsion and during compounding, if the material could be obtained in finely divided form. In order to bring about recovery in such finely divided form, it was attempted to throw down the polymer by means of various agents which, desirably, would break the emulsion, thus flocculating the product, and which would leave no insoluble residue mixed with the product. The emulsifying agent for vinyl chloride-vinylidene chloride polymerization and many other polymerizations is Aquarex D, a commercial preparation consisting essentially of sodium lauryl sulfate, but containing a large amount of sodium sulfate as well. Investigation revealed that the only substances having the desired action in the presence of this emulsifier were compounds of potassium, particularly potassium chloride.

Potassium compounds have the unique property of reacting with the emulsifying agent, sodium lauryl sulfate, to form an insoluble potassium lauryl sulfate. In the cold, a potassium salt, such as potassium chloride, reacts with this emulsifying agent and precipitates potassium lauryl sulfate, the resulting destruction of the dispersing agent causing coalescence of the colloids. The reaction involved is the following:

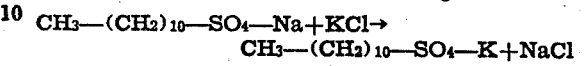

$$CH_3-(CH_2)_{10}-SO_4-Na + KCl \rightarrow$$
$$CH_3-(CH_2)_{10}-SO_4-K + NaCl$$

Adequate agitation of the broken emulsion during this step results in a finely divided product which may be subsequently processed as easily as a crystalloid. Furthermore, the use of the potassium salt leaves the large amount of sodium sulfate present as an impurity in the Aquarex D unchanged, hence it can be washed out of the product very easily. Finally, another peculiar property of potassium lauryl sulfate, its re-solution in hot water, say at 80° C., permits the ready removal of this residue by hot water washing of the polymer. In practice, the liquid is first heated and then both the sodium sulfate and the potassium lauryl sulfate are washed out together. The potassium compound used can be any of those generally available, such as potassium chloride, potassium bromide, and other potassium halides, potassium sulfate, potassium chlorate, potassium bromate, potassium nitrite, potassium hydroxide, potassium sulfide, potassium carbonate, potassium phosphate, and, in general, any potassium compound which reacts with the Aquarex D to give an insoluble potassium lauryl sulfate. Ordinarily, a water-soluble potassium salt is preferred but any potassium compound may be used which reacts with the emulsifier to produce an insoluble potassium lauryl sulfate. In practicing the invention, the copolymer, before setting up, is diluted with a quantity of water, say equal parts, and then an amount of potassium chloride or other potassium compound, chemically equivalent to the alkyl sulfate present, is added or an excess may be used to speed up flocculation. The polymer comes out of the emulsion in fine particles and is then filtered, washed and dried with air.

The process can be applied to the handling of vinyl chloride-vinylidene chloride copolymers and the vinyl halide-vinylidene halide copolymers, e. g., vinyl bromide-vinylidene bromide copolymers, including those in which a third monomeric substance may be combined. Indeed, any polymer or interpolymer which is prepared in an emulsion containing sodium lauryl sulfate as a constituent of the emulsifier used may be advantageously handled by the method. There may be mentioned such polymeric materials as those obtainable from butadiene-acrylonitrile, butadiene-methacrylonitrile, butadiene-styrene, butadiene methyl methacrylate, chloroprene, chloroprene-butadiene, vinyl acetate and vinyl chloracetate. However, the process has found its chief importance in the handling of vinyl chloride-vinylidene chloride copolymers. The copolymers prepared in accordance with the method of the invention can be handled in the dewatering and drying steps in a similar manner to crystalline material. They can be filtered in a centrifuge or in a filter press and may be dried in an air drier as safely and much more quickly than in a vacuum drier, which has previously been the indicated mode of drying. The resulting product is a powder, the main portion of which passes a 100–200 mesh screen and which can be easily compounded to form articles requiring to be constituted from copolymers of the type described. The products are also whiter in color and more uniform in texture than those previously obtainable, are fine enough to require no pulverization and, in the compounded form, show remarkably improved transparency.

While there have been described above the preferred embodiments of the invention, it will be apparent to those skilled in the art that various modifications and changes may be made therein without departing from the spirit of the invention or from the scope of the appended claims.

I claim:

1. A method of recovering a water-insoluble solid polymerized olefinic material from an aqueous emulsion containing sodium lauryl sulfate as the emulsifier which comprises adding, while agitating in the cold, a potassium salt at least molecularly equivalent to the sodium lauryl sulfate to form the potassium salt thereof and break the emulsion, collecting the polymerized material as a finely divided precipitate and washing the same to remove soluble salts therefrom.

2. A method of recovering a water-insoluble solid polymerized olefinic material from an aqueous emulsion containing sodium lauryl sulfate as the emulsifier which comprises adding to said emulsion in the cold in amount at least molecularly equivalent to the sodium lauryl sulfate present, a potassium salt which reacts with sodium lauryl sulfate to form the potassium salt thereof and break the emulsion, meanwhile agitating the emulsion, collecting the polymerized material as a finely divided precipitate and then washing to remove soluble salts therefrom.

3. A method of recovering a solid vinyl halide-vinylidene halide polymer from an aqueous emulsion containing sodium lauryl sulfate which comprises adding to said emulsion in the cold a potassium compound which reacts with sodium lauryl sulfate to form the potassium salt thereof and break the emulsion, collecting the polymer as a finely divided precipitate, and washing the same with hot water to remove potassium lauryl sulfate therefrom.

4. A method of recovering a solid vinyl chloride-vinylidene chloride copolymer from an aqueous emulsion containing sodium lauryl sulfate which comprises adding to said emulsion in the cold a potassium salt which reacts with sodium lauryl sulfate to form the potassium salt thereof and break the emulsion, meanwhile agitating the emulsion, collecting the copolymer as finely divided precipitate, and washing with hot water to remove potassium lauryl sulfate therefrom.

5. A method of recovering a solid vinyl halide-vinylidene halide polymer from an aqueous emulsion containing sodium lauryl sulfate which comprises agitating said emulsion and adding a potassium halide thereto in amount at least molecularly equivalent to the sodium lauryl sulfate present to break the emulsion in the cold, collecting the polymer as a finely divided precipitate and washing the same with hot water to remove potassium lauryl sulfate therefrom.

6. A method of recovering a solid vinyl chloride-vinylidene chloride polymer from an aqueous emulsion containing sodium lauryl sulfate which comprises agitating the emulsion and adding potassium chloride thereto to break the emulsion in the cold, and collecting the polymer as a finely divided precipitate, and washing the same with hot water.

7. A method of recovering a solid vinyl chloride-vinylidene chloride copolymer from an aqueous emulsion containing sodium lauryl sulfate which comprises adding, while agitating in the cold, a potassium halide to said emulsion to break the emulsion and flocculate the polymer, separating the flocculated polymer, and then washing the same to remove soluble salts therefrom.

8. A method of recovering a solid vinyl chloride-vinylidene chloride polymer from an aqueous emulsion containing sodium lauryl sulfate which comprises agitating the emulsion and adding thereto potassium chloride in amount approximately molecularly equivalent to the sodium lauryl sulfate to break the emulsion and flocculate the polymer, separating the flocculated polymer, and then washing the same to remove soluble salts therefrom.

9. A method of recovering a solid vinyl chloride-vinylidene chloride interpolymer from an aqueous emulsion containing sodium lauryl sulfate as an emulsifier which comprises adding potassium chloride, in amount at least molecularly equivalent to the sodium lauryl sulfate present, to said emulsion in the cold while agitating to break the emulsion and precipitate potassium lauryl sulfate and the interpolymer, separating the interpolymer from the liquid in finely divided form, and washing with hot water to remove sodium sulfate, present from the emulsifier, and potassium lauryl sulfate.

10. A method of recovering a solid butadiene-acrylonitrile interpolymer from an aqueous emulsion containing sodium lauryl sulfate as an emulsifier which comprises adding potassium chloride to said emulsion in the cold to break the same and precipitate potassium potassium lauryl sulfate and the polymer, separating the polymer from the liquid in finely divided form, and washing with hot water to remove sodium sulfate, present from the emulsifier, and potassium lauryl sulfate.

11. A method of recovering a solid butadiene-styrene interpolymer from an aqueous emulsion containing sodium lauryl sulfate as an emulsifier which comprises adding potassium chloride to said emulsion in the cold to break the same and precipitate potassium lauryl sulfate and the polymer, separating the polymer from the liquid in finely divided form, and washing with hot water to remove sodium sulfate, present from the emulsifier, and potassium lauryl sulfate.

ALBERT J. GRACIA.

REFERENCES CITED

The following references are of record in the file of this patent:

UNITED STATES PATENTS

| Number | Name | Date |
|---|---|---|
| 2,245,742 | Alexander et al. | June 17, 1941 |
| 2,263,322 | Walker et al. | Nov. 18, 1941 |
| 2,264,173 | Collins | Nov. 25, 1941 |

FOREIGN PATENTS

| Number | Country | Date |
|---|---|---|
| 708,050 | France | Apr. 27, 1931 |

OTHER REFERENCES

Kolloid Zeitschrift, p. 176, vol. LXIII, book 2 (1933).